United States Patent [19]

Chronowski

[11] 4,343,247
[45] Aug. 10, 1982

[54] FLUIDIZED BED COMBUSTION METHOD AND APPARATUS

[75] Inventor: Robert A. Chronowski, Hartford, Wis.

[73] Assignee: Aqua-Chem, Inc., Milwaukee, Wis.

[21] Appl. No.: 164,033

[22] Filed: Jun. 30, 1980

[51] Int. Cl.$^3$ ............................................. F23G 5/00
[52] U.S. Cl. ...................................... 110/245; 431/158;
432/58; 34/57 A; 122/4 D
[58] Field of Search .................. 122/4 D; 110/245;
431/158; 432/58; 34/57 A, 57 B

[56] References Cited

U.S. PATENT DOCUMENTS

| | | | |
|---|---|---|---|
| 2,842,102 | 7/1958 | Blaskowsi | 122/4 D |
| 2,976,853 | 3/1961 | Hunter et al. | 122/4 D |
| 2,997,031 | 8/1961 | Ulmer | 122/4 D |
| 3,376,098 | 4/1968 | Pryor | 431/158 |
| 3,898,043 | 8/1975 | Schutte et al. | 122/4 D |
| 3,904,375 | 9/1975 | Calbeck | 34/57 A |
| 3,974,091 | 8/1976 | Parker et al. | 34/57 A |
| 4,240,378 | 12/1980 | Caplin | 122/4 D |
| 4,249,885 | 2/1981 | Reich | 431/158 |
| 4,258,005 | 3/1981 | Ito et al. | 110/245 |
| 4,263,857 | 4/1981 | Ban | 110/270 |

FOREIGN PATENT DOCUMENTS

| | | | |
|---|---|---|---|
| 792682 | 4/1958 | United Kingdom | 122/4 D |
| 2001157 | 1/1979 | United Kingdom | 122/4 D |

*Primary Examiner*—Henry C. Yuen

[57] ABSTRACT

A fluidized bed combustion device adapted for use with a boiler has an air distributor consisting of a plurality of rows of generally horizontally oriented, apertured sparge pipes disposed in a bed of inert particulate material. The rows of pipes are vertically spaced apart with the upper row being connected to a start-up burner for receiving heated combustion products and excess air and the lower rows of pipes are connected to selectively receive air or inert gases through a separate delivery path. During start-up and low load conditions, only the upper row of pipes is pressurized and so that only the upper portion of the bed is fluidized to minimize the heat input requirements. Once the upper portion of the bed has been heated to the required temperature, primary fuel is delivered to sustain combustion without the start-up burner. At the completion of the start-up process and during high fire conditions all of the rows of tubes are pressurized to provide a deeper bed of fluidized material.

3 Claims, 3 Drawing Figures

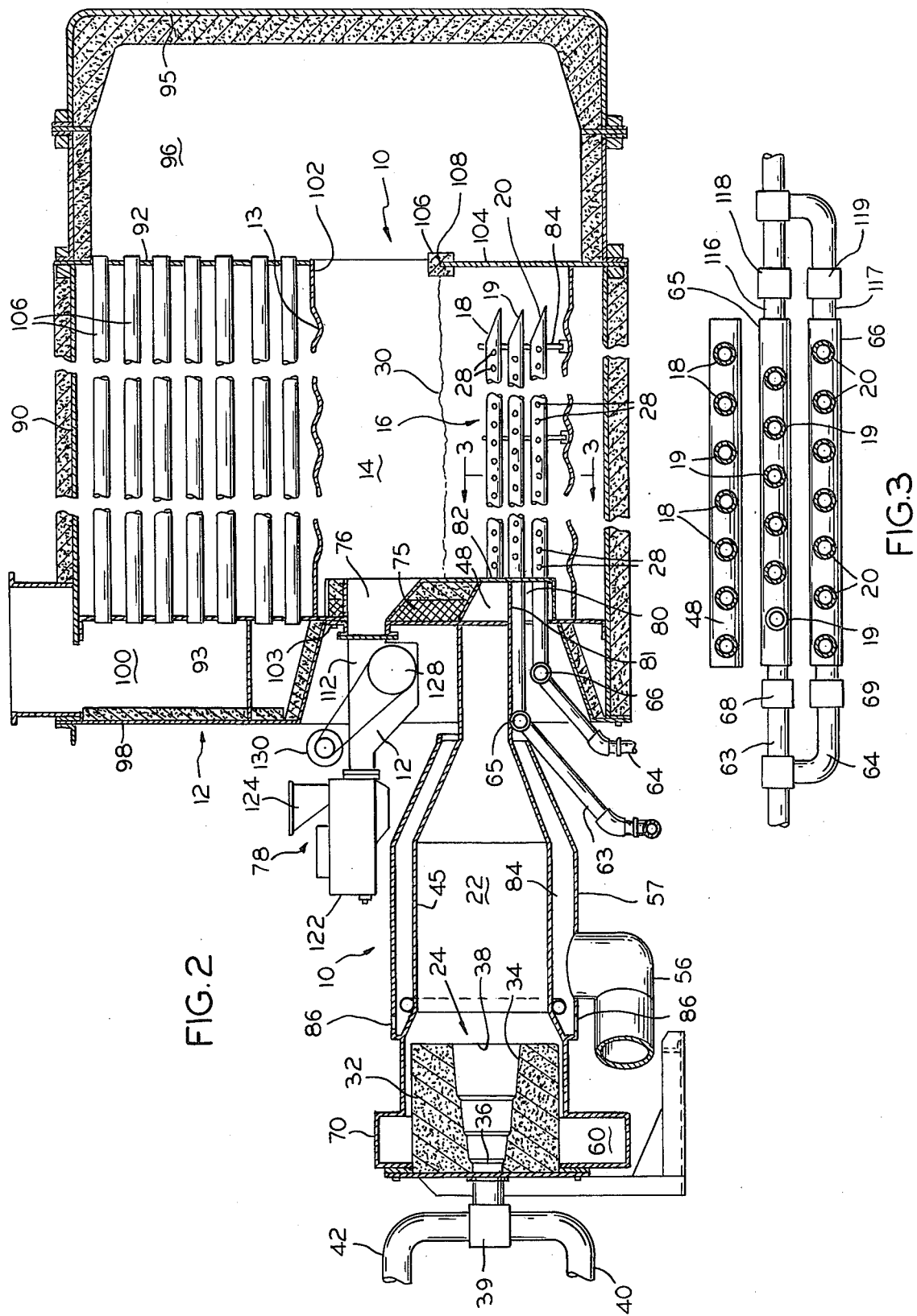

FLUIDIZED BED COMBUSTION METHOD AND APPARATUS

BACKGROUND OF THE INVENTION

This invention relates generally to fluidized bed boilers.

One type of boiler employs fluidized particles as a heat exchange medium. In such boilers, inert particles, such as sand, are placed in a fluidized state by air delivered from below through a porous plate or a tubular grid structure. The air also provides at least a portion of the oxygen required to burn fuel within the bed for heating the particles. In order to initiate the combustion process, an auxiliary burner may be provided to preheat the particulate material.

The particulate material represents a large mass which must be heated at start-up to a level sufficient to safely ignite and sustain combustion of the primary fuel. However, the high heat transfer coefficient existing between the bed and the transfer surface in fluidized bed systems has made start-up and low load operations difficult and somewhat dangerous, especially in steam or hot water boiler applications. Because conventional fluidized beds tend to rapidly reject heat, a significant heat input is required to reach the desired bed temperature. In some cases, heat inputs of up to twenty percent of the boiler rating are necessary to achieve primary fuel combustion temperature. Even when the temperature of the fluidized bed reaches or exceeds this temperature, there may still be great difficulty in maintaining bed temperature if boiler load is rapidly applied and if the start-up heat source is discontinued. It is not unusual for such a system to require heat inputs of up to thirty to forty percent of maximum load before the start-up burner may be safely shutdown.

Prior art attempts at achieving start-up and low load operation of fluidized bed systems have included the use of multiple cells or chambers, each containing a portion of the total system mass of bed material. This permits the bed material to be heated in stages during the start-up process. Another prior art system includes apparatus for the withdrawal of bed material to allow start-up and low load operation with a shallow bed and the delivery of additional bed material into the system as the temperature and load are increased. Such systems are not wholly satisfactory because they are relatively expensive and involve complex control considerations. Also, because of the necessity to remove and store or dispose of relatively hot bed material when the load is decreased, the material transport system presents safety hazards.

OBJECTS OF THE INVENTION

It is a primary object of the present invention to provide a new and improved fluidized bed combustor for boilers.

A further object of the invention is to provide a fluidized bed combustor for boilers which permits efficient start-up and low load operation without relatively expensive construction or complicated controls.

Another object of the present invention is to provide a fluidized bed combustor wherein the finely divided material may be segregated into active and inactive zones.

A further object of the present invention is to provide a fluidized bed combustor method and apparatus wherein an optimum quantity of fluidized bed material is present at start-up and during operation at all loads.

A still further object of the present invention is to provide an apparatus and method for starting and operating a fluidized bed combustor for boilers wherein the operating time for the start-up heat source can be minimized.

Yet another object of the present invention is to provide a fluidized bed combuster apparatus and method wherein the active quantity of bed material can be controlled without the necessity for material transport and storage.

Yet another object of the present invention is to provide a fluidizing bed combustor which can be cycled between start-up, low load and full load in an efficient, safe and economical manner.

A still further object of the present invention is to provide an apparatus and method for start-up and low load operation of a fluidized bed combustor that is simple and easy to incorporate into existing boilers.

How these and other objects of the invention are accomplished will be described in the following specification taken in conjunction with the drawings.

According to one of its aspects, the invention comprises a fluidized bed combustion device including a quantity of particulate material disposed within a container to define a bed. A gas distributor is disposed within the container and has at least a portion of the particulate material disposed thereabove. The distributor is perforate for distributing fluidizing gases to plural zones within the bed and has a first portion disposed within the bed and a separate second portion disposed below the first portion. A gas delivery system is provided for delivering fluidizing gas to the distributor and includes a control for selectively delivering gas to the first and second portions of the distributor whereby the upper portion of the bed may be fluidized while the lower portions thereof may remain quiescent.

According to another of its aspects, the invention comprises a combustion method comprising burning fuel in a combustion device, containing a quantity of particular material in a bed, conducting the combustion products from the combustion device to a first distributor disposed in quantity of particulate material forming a bed to fluidize a first portion of the particulate material, initially maintaining the particulate material in the lower areas of said bed quiescent, heating the fluidized particulate material in the upper portion of said bed with the combustion products to a preselected temperature, delivering fuel to the fluidized portion of the bed for combustion, wherein the preselected temperature is at least equal to the combustion temperatures of the fuel and delivering fluidizing gas to a second distributor located below the first distributor to fluidize the particulate material disposed in the lower regions after the particulate material in the upper portion of the bed has been heated.

More specifically, the objects are accomplished by providing a fluidizing grid assembly having individually controlled portions for selectively controlling the volume and flow paths of the fluidizing medium. The grid assembly is located within a mass of finally divided bed material constituting the medium to be fluidized. A primary fuel injector is located above the bed for introducing fuel into the fluidized bed during operation at higher loads. The grid assembly preferably comprises a plurality of vertically spaced apart rows of parallel, elongate tubular sparge elements. Each tubular element has a plurality of openings spaced along its length to permit flow of the fluidizing medium into the surrounding bed material. The upper row is connected to a combustion chamber for receiving heated combustion products and excess air at a controlled rate so that the degree of fluidization in the upper zone of bed material may be controlled. Air or inert gas is selectively directed to the lower rows through controlled flow paths so that the lower portion of the bed may remain quiescent during start-up and low load operation. These stagnant lower zones serve to insulate the active upper zone during start-up and low load operation, thus permitting the upper zone to more quickly and economically reach a predetermined temperature. After the upper zone reaches the temperature necessary to ignite and sustain operation on the primary fuel alone, control dampers are opened to fluidize the lower zones commensurate with the load being imposed upon the system. The fluidizing grid assembly according to the present invention may be easily controlled to meet decreasing load demands by reversing the process described. With the grid assembly and process of the present invention, re-ignition of the start-up burner will typically be at an imposed load value of from fifteen to twenty-five percent of full load. By utilizing the fluidizing grid assembly to selectively activate a portion or all of the bed material as described above, a wide range of imposed loads may be safely and conveniently accommodated.

BRIEF DESCRIPTION OF THE DRAWING

FIG. 2 is a top plan view partly in section of the fluidized bed assembly of FIG. 1; and FIG. 3 is a view taken along lines 3—3 of FIG. 1 but showing only the grid structure and the manifolds connected thereto.

DESCRIPTION OF THE PREFERRED EMBODIMENT

Figure 1:
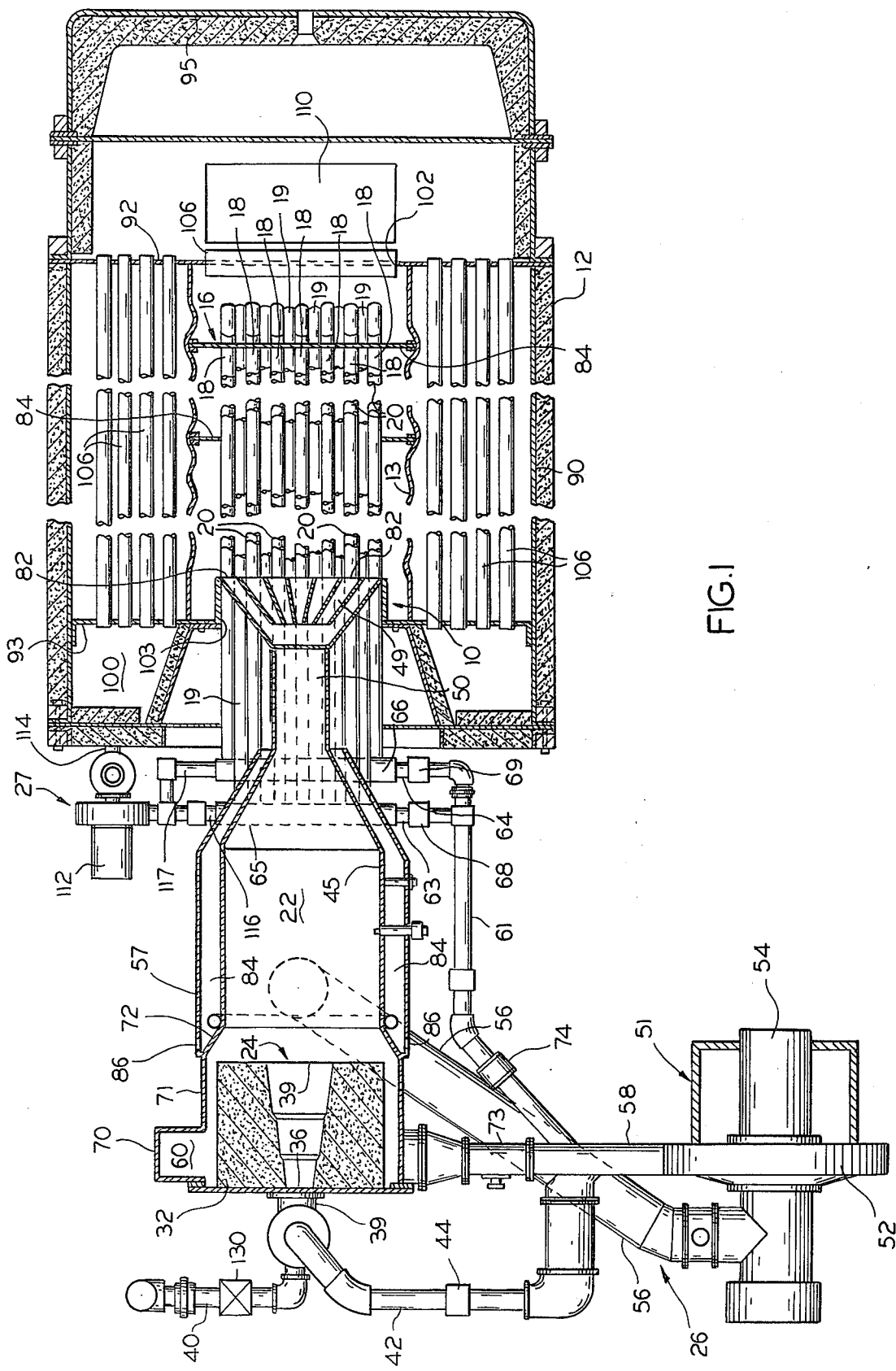
FIG. 1 is a side elevational view, partly in section of the fluidizing bed assembly of the present invention.

FIGS. 1 and 2 show a fluidized bed combustion device 10 coupled to a boiler 12. The combustion device includes a tubular container 13 defining a fluidizing chamber 14. An air distribution grid 16 extends generally horizontally across the lower end of chamber 14 and includes a plurality of rows of parallel, generally horizontally oriented, sparge pipes arranged in an upper row 18, a middle row 19 and a lower row 20. As seen in FIG. 3, the pipes 19 of the middle row may be staggered relative to the pipes 18 and 20 of the other two rows. The upper row of pipes 18 are coupled to a combustion chamber 22 for receiving combustion products from a start-up burner 24. While pipes 18, 19 and 20 are shown to be circular in cross-section, pipes having any cross-sectional configuration may be employed. An air delivery system 26 provides combustion air to combustion chamber 22 and selectively to the lower rows 19 and 20. A flue gas recirculation system 27 is also coupled for selectively delivering flue gases to one or both of the lower rows of pipes 19 and 20.

The sparge pipes 18, 19 and 20 each have a plurality of longitudinally spaced apart apertures 28 so that air or combustion products delivered to the pipes will exit apertures 28 at a sufficient volume and velocity to fluidize the particulate material 30 within the chamber 14. The apertures 28 may be at any convenient location in pipes 18 and 19 but are preferrably in the sides so that relatively larger holes can be used without the bed particles flowing into the pipes 18, 19 or 20. The apertures in adjacent pipes may also be staggered for more even air distribution in the bed. The particles 30 are preferrably grains of an inert material having a relatively high fusion temperature and a high heat absorption capacity, such as sand.

While the start-up burner 24 may be of any conventional type, a gas burner is shown in the illustrated embodiment. The burner includes a body 32 of refractory material having a central bore 34 which diverges outwardly from its inlet end 36 to its outlet end 38. Coupled to the inlet end 36 of bore 34 is a mixing chamber 39, which in turn is coupled to a gaseous fuel delivery pipe 40 and a primary air delivery pipe 42. As those skilled in the art will appreciate, the gaseous fuel and air are mixed in chamber 39 and delivered to the inlet 36 of bore 34. A pilot or start-up sparking device (not shown) is disposed adjacent the inlet 36 of bore 34 for igniting the gas air mixture delivered thereto. The gas pipe 40 is connected to a suitable source of gaseous fuel (not shown) and may include a modulating or control valve 43. The primary air delivery pipe 42 has a conventional damper 44 and is connected to the air delivery system 26. While in the illustrated embodiment a gas burner 24 is shown, those skilled in the art will appreciate that a suitable oil or solid fuel burner may be employed instead of gas burner 24 or two burners using alternate fuels may be provided.

The combustion chamber 22 is defined by a generally cylindrical first section 45 which communicates with the outlet end 38 of the start-up burner 24 and a frusto-conical outlet section 46 communicating with one end of a relatively narrower plenum chamber 47. At the opposite end of the plenum chamber 47 there is a distributor 48 having outwardly divergent side walls 49 and a plurality of baffles 50. The inlet ends of tubes 18 open into distributor 48 in the spaces defined by the baffles 50 and side walls 49.

The air delivery system 26 includes a blower 51 consisting of the fan 52 driven by a motor 54. The inlet of fan 46 is connected by a first pipe 56 to a jacket 57 surrounding the combustion chamber 22. The outlet of fan 52 is connected by a second pipe 58 to a scroll chamber 60 which surrounds the start-up burner 24. In addition, a third pipe 61 connects the outlet of fan 52 to first and second pipes 63 and 64 which are in turn respectively connected to manifold pipes 65 and 66. Manifold pipes 65 and 66 are respectively connected to the inlet ends of sparge pipes 19 and 20. Dampers 68 and 69 are respectively disposed in pipes 63 and 64 whereby cool unheated air may be selectively supplied to the sparge pipes 19 and/or 20.

The scroll chamber 60 is defined by a hollow housing 70 disposed in surrounding relation to the start-up burner 24 and having a constantly increasing radius from its point of connection to pipe 58 to its terminal end. A jacket 71 is disposed adjacent the scroll chamber 60 and in surrounding relation to burner 24 and opens into the scroll chamber at one end and to the large diameter end of a frusto-conical throat section 72, the other end of which is connected to the combustion chamber 22. Air in excess of that required for combustion in chamber 22 is delivered from the scroll chamber 60 through jacket 71 to the inlet end of combustion chamber 22. The eccentric shape of scroll chamber 60 tends to equalize the flow of excess air around the jacket 71. Second and third dampers 73 and 74 are respectively connected into pipes 58 and 61 so that excess air can be delivered to the scroll chamber 60 and the manifolds 65 and 66 at controlled rates.

The container 13 which defines the fluidized bed comprises a generally cylindrical housing which is disposed with its axis oriented generally horizontally. Suitably supported at one end of chamber 14 and substantially filling the upstream end thereof is a refractory member 75. A first opening 76 is formed adjacent the upper end of member 75 and is coupled to a fuel delivery system 78 and a second opening 80 is formed adjacent to the lower end of member 75 and is subdivided by partition 81 into the distributor 48 and a passage for pipes 19 and 20. A tube sheet 82 is affixed to member 74 on the downstream side of distributor 48 and has a plurality of perforations for receiving the inlet ends of sparge pipes 18 while the inlet ends of pipes 19 and 20 are respectively connected to manifolds 65 and 66. The pipes 18, 19 and 20 are thus supported at their inlet ends and extend therefrom axially into container 13 and in a generally horizontal or slightly downwardly inclined direction where their opposite ends are, supported by suitable brackets 84 which, extend upwardly from the lower end of enclosure 13.

The jacket 57 is configured similarly to the combustion chamber housing 45 and is spaced therefrom to define a space 84 therebetween. The small diameter end of jacket 57 is open and there are a plurality of apertures 86 at the large diameter end. As a result of the suction produced by the inlet of fan 52, which is connected to jacket 57 by pipe 56, relatively cool air is drawn into the space 84 through the open end of jacket 57 and the apertures 86. This air then flows to fan 52 through pipe 56 to provide combustion air for the system while additionally performing the function of cooling combustion chamber housing 45.

The boiler 12 may be of any conventional type but in the illustrated embodiment is of the fire tube type. As those skilled in the art will appreciate, a fire tube boiler may include an outer metallic housing 90 which may be insulated in a well-known manner. Extending transversely across the housing 90 are a pair of tube sheets 92 and 93 which are spaced apart a distance substantially equal to the length of fluidizing chamber 13. The tube sheet 92 is also spaced from the front end 95 of housing 90 to define a fire space 96 and the tube sheet 93 is spaced from the front wall 98 of housing 90 to define a flue space 100. Circular openings 102 and 103 are formed in the lower portions of tube sheets 92 and 93 and are in general registry with the opposite ends of the fluidizing container 13 extending therebetween. A semicircular gate 104 extends across the lower portion of housing 13 and refractory strip 106 extends across its horizontal upper edge 108. The refractory body 75 is affixed in and extends through the opening 103 at the opposite end of container 13.

A plurality of fire tubes 106 extend between the tube sheets 92 and 93 about the sides of and above the fluidizing container 13. The space between the tube sheets 92 and 93 and around the tubes 107 will be connected in a conventional manner for receiving water to be heated. While the boiler 12 as shown in the drawings to have a single pass between the fire space 96 and the flue space 100, those skilled in the art will appreciate that horizontal partitions (not shown) may extend across each of these spaces for redirecting the hot gases through a plurality of passes so that the maximum quantity of heat can be extracted from the heated combustion products. Also, a trap door not shown may be provided in the lower end of fire space 96 for the removal of ashes.

The inlet of a flue gas blower 112 is connected by a conduit 114 to the flue space 100 and its outlet is connected by pipes 116 and 117 to the manifold pipes 65 and 66. It will be recalled that manifold pipes 65 and 66 are respectively connected to the sparge pipes 19 and 20. Dampers 118 and 119 are respectively connected in pipes 116 and 117 so that flue gases may be selectively delivered to sparge pipes 19 and/or 20.

The fuel feeder 78 includes a screw feed device 122 which is connected by a chute 124 to a suitable source of solid fuel such as coal (not shown). The inlet to screw feeder 122 is connected to a bin 126 affixed to the boiler feeder 78 and in registry with opening 76 in body 74. A paddle wheel feeder 128 disposed in bin 126 is driven by a motor 130 for throwing crushed coal through opening 76 and into the bed of fluidizing material 30.

On start-up, dampers 68, 69, 118 and 119 will be closed and dampers 44 and 73 will be open to the extent necessary to provide the desired fuel air ratio and the desired quantity of excess air to achieve a temperature at the inlet of tubes 18 of about 1600°–1700° F. and to provide the desired gas flow necessary to fluidize the bed 30. It will be appreciated that a conventional air-fuel ratio controller (not shown) is connected to dampers 44 and 73 and to the valve 130 in fuel supply conduit 40. This will insure the necessary air-fuel ration for the desired combustion conditions in the manner well known in the art.

The fuel-air mixture is ignited in a conventional manner with the resulting combustion products and the excess air drawn through scroll housing 70 flows to the plenum chamber 47 and from there to the tubes 18. This will fluidize the upper portion of the particulate material 30 which will become heated as the hot gases flow therethrough. Since the dampers 68, 69, 118 and 119 are closed, no air or flue gases will be delivered to the central and lower sparge pipes 19 or 20. As a result, the bed material 30 in the lower portions of the zone will not be fluidized to provide a stagnant zone in the central and lower regions of the bed. This stagnant zone reduces the mass of fluidized bed material which must be heated and also act to insulate the fluidized portion of bed from lower portion of the housing 13. As a result, the fluidized portion of the bed may be raised to the desired temperature more rapidly. When the fluidized upper portion of the bed has reached a temperature sufficient to ignite the primary fuel, the latter is injected into the high temperature upper bed area by the fuel delivery system 78. The primary fuel will then ignite, further elevating the upper bed temperature. When the heat output from the container 13 reaches about fifteen to twenty-five percent of full load, the start-up burner 24 may be shut down.

As those skilled in the art will appreciate, the hot combustion products exiting the fluidizing chamber 14 will pass into the fire space 96 whereupon it will reverse direction and flow through the fire tubes 106 to heat the surrounding water. After passage through the fire tubes 106 in one or more passes, the hot gases will enter the flue space 100 for discharge.

After the start-up burner has been shut down and as load demand increases, the dampers 68 or 118 may be open to provide fluidizing air or flue gases to the central row of sparge pipes 19. This provides fluidizing gases to the previously quiescent central zone of the bed 30. As a result, both the upper and central portions of the bed becomes fluidized and heated by the combustion of the primary fuel. Upon further increase in load demand, the dampers 69 or 119 may be opened to fluidize the row of sparge pipes 20 to fluidize the lower portion of the bed 30 as well. The use of air or the inert flue gases in the central or lower sparge pipes 19 and 20 will depend upon the amount of air required to burn the primary fuel without introducing substantial excess air to the system. By deepening the bed in this manner either by cooler air or inert flue gases, greater bed temperature control can be obtained and higher load factors achieved by increasing the amount of heat transfer surface exposed to the bed by mixing the hot active bed material with the cooler newly fluidized material, and by removing additional sensible heat from the bed by the increase of overall gas flow.

Should the load drop to about fifteen to twenty-five percent of full load, the dampers 68, 69 or 116, 117 which provide air or flue gases to the center and lower sparge pipes 19 and 20 will again be closed. As a result, only the upper portion of the fluidized bed will be active as during start-up. Should the load fall below about fifteen to twenty-five percent of full load, the start-up burner 24 will again be activated to sustain the desired bed temperature.

While the preferred embodiment is shown to include three rows of sparge pipes, the invention also contemplates the use of two rows or more than three. Also, while the invention is illustrated in connection with a fire tube boiler, the illustrated combustion device may also be employed with a water tube or other type of boiler. Therefore, while only a single embodiment of the invention has been illustrated and described, it is not intended to be limited thereby but only by the scope of the appended claims.

I claim:

1. A fluidized bed combustion device including a quantity of particulate material defining a unitary bed,
    a first gas distributor comprising a row of aligned elongate tubular members disposed within a central portion of said bed and a second distributor comprising a row of aligned elongate tubular members disposed in said bed and below said first row of tubular members and in general parallelism therewith,
    said tubular members each having a plurality of axially spaced perforations formed therein for distributing fluidizing gases to plural zones within said bed,
    gas delivery means and air delivery means respectively coupled to said first and second distributors,
    control means coupled to said gas delivery means and to said air delivery means and operable to permit the flow of fluidizing gas to said first distributor and for preventing the flow of fluidizing air to said second distributor whereby the portion of the bed above the first distributor is fluidized while the remaining portion therebelow is quiescent, said control means also being operable to simultaneously affect the delivery of fluidizing gas to said first distributor and air to said second distributor, said distributors thereby cooperating to simultaneously fluidize the entire bed at least to the depth of said second distributor,
    means for selectively delivering fuel to said bed,
    said combustion device further including a start-up burner and a combustion chamber having a first end and on opposite end, said start-up burner being disposed at the first end of said combustion chamber and said gas delivery means being coupled to the opposite end of said combustion chamber whereby heated combustion products are delivered therefrom to said first gas distributor, and
    said air delivery means including a fan and a jacket surrounding said combustion chamber having openings formed therein, the inlet of said fan being connected to said jacket for drawing air through said openings and into the space between said jacket and said combustion chamber and then into the inlet of said fan.

2. The fluidized bed combustion device set forth in claim 1 wherein said air delivery means is also connected to the first portion of said gas delivery means for delivering excess air thereto for passage to the first portion of said distributor means.

3. The fluidized bed combustion device set forth in claim 2 and including means for selectively delivering fuel to said bed and from above the upper portion of said distributor.

* * * * *